US010613191B2

(12) United States Patent
Pham et al.

(10) Patent No.: US 10,613,191 B2
(45) Date of Patent: Apr. 7, 2020

(54) OBJECT TRACKING AND RANGING

(71) Applicant: Honeywell International Inc., Morris Plains, NJ (US)

(72) Inventors: Hai D. Pham, Eden Prairie, MN (US); Alan Cornett, Andover, MN (US); Christian Larson, Golden Valley, MN (US); Glen Backes, Maple Grove, MN (US); Soumitri N. Kolavennu, Blaine, MN (US)

(73) Assignee: Honeywell International Inc., Morris Plains, NJ (US)

( * ) Notice: Subject to any disclaimer, the term of this patent is extended or adjusted under 35 U.S.C. 154(b) by 17 days.

(21) Appl. No.: 15/982,848

(22) Filed: May 17, 2018

(65) Prior Publication Data

US 2019/0072637 A1 Mar. 7, 2019

Related U.S. Application Data

(60) Provisional application No. 62/555,354, filed on Sep. 7, 2017.

(51) Int. Cl.
*H04W 24/00* (2009.01)
*G01S 5/14* (2006.01)
*G01C 21/34* (2006.01)
*G01C 21/28* (2006.01)
*G01S 5/08* (2006.01)
*G01S 5/04* (2006.01)
*G01S 5/02* (2010.01)
*G01S 1/04* (2006.01)

(52) U.S. Cl.
CPC .............. *G01S 5/14* (2013.01); *G01C 21/28* (2013.01); *G01C 21/3407* (2013.01); *G01S 1/045* (2013.01); *G01S 5/0205* (2013.01); *G01S 5/0221* (2013.01); *G01S 5/04* (2013.01); *G01S 5/08* (2013.01)

(58) Field of Classification Search
CPC ..... G01S 5/14; G01S 5/04; G01S 5/08; G01C 21/3407; G01C 21/28
USPC .................................... 455/456.1, 456.3–457
See application file for complete search history.

(56) References Cited

U.S. PATENT DOCUMENTS

| | | | | |
|---|---|---|---|---|
| 7,286,834 | B2* | 10/2007 | Walter | H04W 12/00503 455/456.1 |
| 2009/0280775 | A1* | 11/2009 | Moeglein | G01S 5/0236 455/410 |
| 2012/0026041 | A1* | 2/2012 | Murdock | G01S 5/0289 342/387 |
| 2012/0077513 | A1* | 3/2012 | Rizzello | G01S 5/14 455/456.1 |
| 2012/0127032 | A1* | 5/2012 | McClure | G01S 19/13 342/357.44 |
| 2016/0261306 | A1* | 9/2016 | Seller | H04W 56/0015 |
| 2017/0030995 | A1* | 2/2017 | Khong | G01S 5/0289 |

(Continued)

*Primary Examiner* — Khoi H Tran
*Assistant Examiner* — B M M Hannan
(74) *Attorney, Agent, or Firm* — Schwegman Lundberg & Woessner, P.A.

(57) ABSTRACT

A location system includes multiple master nodes located at corners of a coverage area. At least two master nodes are located on one edge of the coverage area and receive signals from a slave node within the coverage area. The at least two master nodes calculate a distance to the slave node and a location of the slave node within the coverage area.

19 Claims, 3 Drawing Sheets

(56) References Cited

U.S. PATENT DOCUMENTS

2017/0257779 A1\* 9/2017 Zerick ................... H04W 24/02
2017/0328679 A1\* 11/2017 Smith ................... F41G 7/2233

\* cited by examiner

OBJECT TRACKING AND RANGING

RELATED APPLICATION

This application claims priority to U.S. Provisional Application Ser. No. 62/555,354 (entitled Object Tracking and Ranging, filed Sep. 7, 2017) which is incorporated herein by reference.

BACKGROUND

Long range tracking of moving object in the GPS denial environment is a challenge. Many wireless technologies have a very short range and do not have sufficient range and accuracy for triangulation without an excessive number of anchor points to triangulate from.

SUMMARY

A location system includes multiple master nodes located at corners of a coverage area. At least two master nodes are located on one edge of the coverage area and receive signals from a slave node within the coverage area. The at least two master nodes calculate a distance to the slave node and a location of the slave node within the coverage area.

A method includes receiving signals from an object within an area of coverage at least two adjacent corners of the area of coverage, determining a range of the object from each of the at least two adjacent corners, and calculating a location of the object within the area of coverage response to the determined ranges.

A machine-readable storage device has instructions for execution by a processor of the machine to perform operations. The operations include receiving signals from an object within an area of coverage at least two adjacent corners of the area of coverage, determining a range of the object from each of the at least two adjacent corners, and calculating a location of the object within the area of coverage response to the determined ranges.

DETAILED DESCRIPTION

Figure 1:
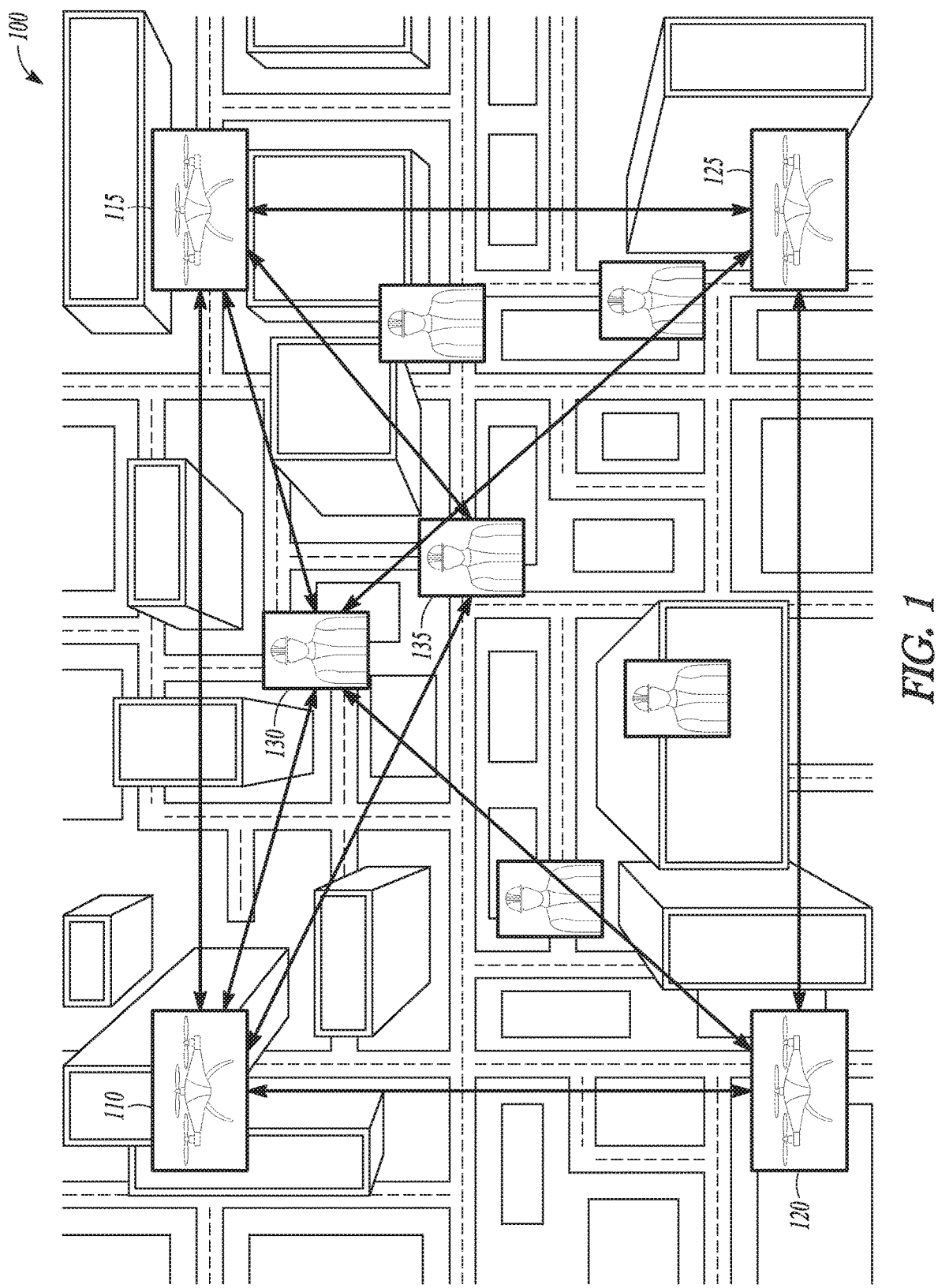
FIG. 1 is a block diagram representation of a location tracking and mapping system and corresponding environment according to an example embodiment.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software in one embodiment. The software may consist of computer executable instructions stored on computer readable media or computer readable storage device such as one or more non-transitory memories or other type of hardware based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

A location system includes four master nodes located at corners of a coverage area that circumscribes an area desired to be covered. At least two master nodes on one edge of the coverage area receive signals from a slave node within the coverage area and calculate a location of the slave node responsive to such received signals.

Three, four, or more master nodes may be used in further embodiments to define the coverage area and to ensure that the slave node is within the coverage area. Two master nodes defining an edge of the coverage area may be used to determine location of the slave node. The object to be tracked/slave node, can be referenced to more than two master nodes for accuracy improvement and a guaranty that the object to tracked/slave node, is inside the coverage area. A LoRa transceiver with ranging capability specification is intended for wireless battery-operated devices, such as Internet of Things (IOT) devices in a regional, national or global network. A LoRa transceiver with a Ranging Engine and Time-of-flight function, such as a SEMTECH SX1280/SX1281 may be used in various embodiments of the present inventive subject matter. Such a transceiver provides secure bi-directional communication, mobility and localization services.

Where an area desired to be covered is defined by one or more curved lines or the area is irregular, master nodes may be located at two or more corners of a minimum perimeter rectangle circumscribing a convex hull of the area desired be covered. In other words, the area desired to be covered is located entirely within the minimum perimeter rectangle or polygon defining the coverage area.

A tracking and ranging system that includes multiple master, multiple slave communication, such as a LoRa ranging tracking technique for example, allows slave nodes to directly communicate with master nodes. In one embodiment, master nodes may be mounted in the copter drones or on high poles for better line of sight (LOS) about the coverage area. Such mounting provides known fixed or measured distances of the master nodes along with the ranging distances of the device slave node. The position of the device slave node can be accurately calculated by simple triangulation. Maps may also be easily generated for visualization. The system may be used to locate entities having an associated slave node, such as workers, vehicles (fire, police, and ambulance), and high value equipment. The system may also be used for many other applications, including military applications.

FIG. 1 is a block diagram representation of a location tracking and mapping system 100 and corresponding environment according to an example embodiment. In one embodiment, four master nodes 110, 115, 120, and 125 are located in known fixed positions at corners of a square shape. The positions may be known either from setting up the fixed positions via GPS or survey measurement, or from GPS equipment located at or incorporated into the master nodes.

The distance, D, between each pair of nodes forming sides of the square shape is the same in one embodiment. The master nodes may be mounted on poles having the relatively similar elevation or on buildings, trees, or even flying drones that can be held in the fixed position for long enough duration to locate the asset comprising a slave node. The height of the master nodes may be adjusted as desired based on terrain. The height may ideally be above the tree lines, hills, tall buildings, or other obstructions in an area of desired coverage for better line of sight to one or more slave nodes 130, 135 associated with respective assets, such as people, equipment, vehicles, or other objects or things (internee of things for example) whose location is desired to be tracked. Distances between the nodes and at least two master nodes are illustrated as ranging a, and ranging b in FIG. 1, where a is the distance between master node 110 and slave node 130, and b is the distance between master node 115 and slave node 130. The distances, a and b can be formed from the slave node 130 to master nodes 110 and 120. The distances can also be formed from the slave node 130 to other master nodes as indicated by the lines to master nodes 120 and 125. Each of the sets of slave node and master nodes form a triangle, which allows tracking of the object corresponding to the slave node.

While a square shaped coverage area is described, and is perhaps most efficient in terms of minimizing the number of master nodes, many different shapes, such as polygons may also be used, with data from master nodes at at least two adjacent corners of the area of coverage being used to determine ranges and location of the tracked object.

Figure 2:
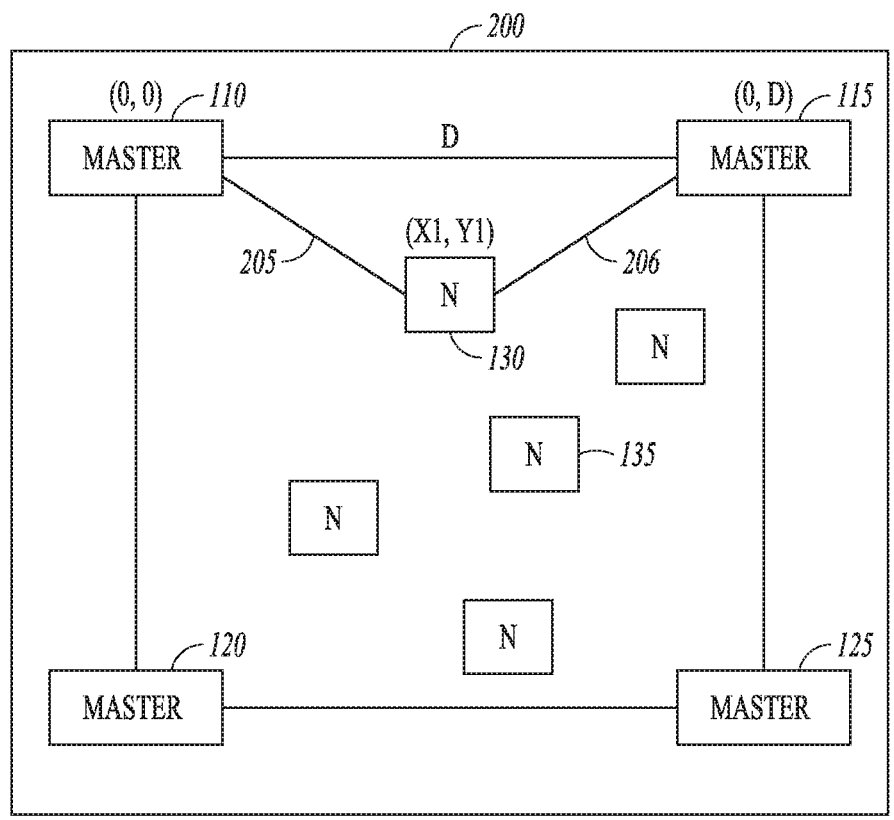
FIG. 2 is a block diagram representation of a location tracking and mapping system with algorithms for locating an asset within an area of coverage according to an example embodiment.

FIG. 2 is a block diagram representation 200 of a location tracking and mapping system with algorithms for locating an asset within an area of coverage according to an example embodiment. The variables are consistent with those illustrated in FIG. 1, where D is the fixed distance (D=10 kilometers in one embodiment), a is the ranging measurement 205 from master node 110 to slave node 130, and b is the ranging measurement 206 from master node 115 to slave node 130. In one embodiment, D is an available range of the master nodes. 10 kilometers is used only as an example. X1 and Y1 are the coordinates for the located asset/slave node 130 within the coverage area, with master node 110 located at the origin of a coordinate system: x=0 and y=0 (0,0) where an x-axis extends from master node 110 towards master node 115 and a y-axis extends from the x-axis to the slave node 130. In one embodiment, slave node 135 is within communication range of all four master nodes. Strongest signals between nodes may be used to determine location, or even averages between locations calculated by two or more pairs of different master nodes' range measurements may be used in further embodiments, which may improve accuracy.

In one embodiment, the position of slave node 130 may be calculated in accordance with the following equation: $x1=(D^2+a^2-b^2)/2D$ and $y1=a^2-x1^2$. The equation may be derived by considering the three points, master node 110, master node 115 and slave node 130 as forming a triangle. The triangle is then divided into two right triangles and the Pythagorean theorem is then applied to both triangles to derive the above equation.

Data from master nodes may be communicated to a single master node or remote server/cloud resources for performance of the calculations to determine the location of the asset. The calculated location may also be provided to a user interface on one or more computer systems, such as a laptop, desk top, mobile devices, or other type of device for communicating location information to a user.

Figure 3:
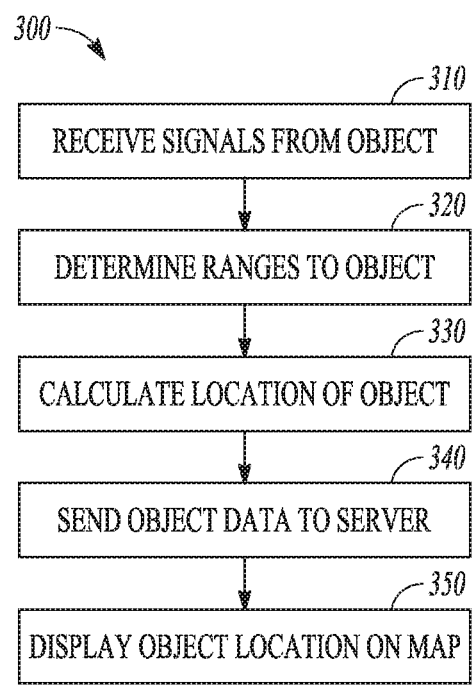
FIG. 3 is a flowchart illustrating a method of determining a location of an object according to an example embodiment.

FIG. 3 is a flowchart illustrating a computer implemented method 300 of locating an object according to an example embodiment. At operation 310, signals are received from an object within an area of coverage at two or more adjacent corners of the coverage area. In one embodiment, the adjacent corners with the strongest received signals may be selected for further performance of method 300. At operation 320, a range of the object from each of the at least two adjacent corners is determined. The corners may include signal receiving equipment, such as a receiver or transceiver in order to receive the signals. Processing resources at the equipment may be used to determine the distances. A location of the object within the area of coverage or coverage area, in response to the determined ranges, is then calculated using a form of triangulation as described above via operation 330.

Data from the calculations may be sent to a server at operation 340. The data may include an identifier of the object as well as the calculated location data. In some embodiments, the raw range data may be sent with the server performing the calculations to determine the location of the object. At operation 350, the server may display the location of the object on a map viewable by one or more users. The object may be shown on the map, which may be a graphical representation of the coverage area or area desired to be covered, or even a satellite image of the area. The server may be local, remote, or cloud based in some embodiments. The server may be a mobile device or in communication with a mobile device, with the map being displayed on the mobile device.

In one embodiment, the object comprises a communication system slave node and the at least two adjacent corners comprise communication system master nodes. The master nodes may be mounted in fixed positions at similar heights, and may execute a LoRa time-of-flight ranging compliant communication protocol with the slave node. The height of the master nodes may be selected to provide clear line of sight to slave nodes within the area of coverage.

In one embodiment, the master nodes may be mounted on flying drones capable of remaining at a fixed position while the signals are received. The slave node may be associated with an object to be tracked.

Figure 4:
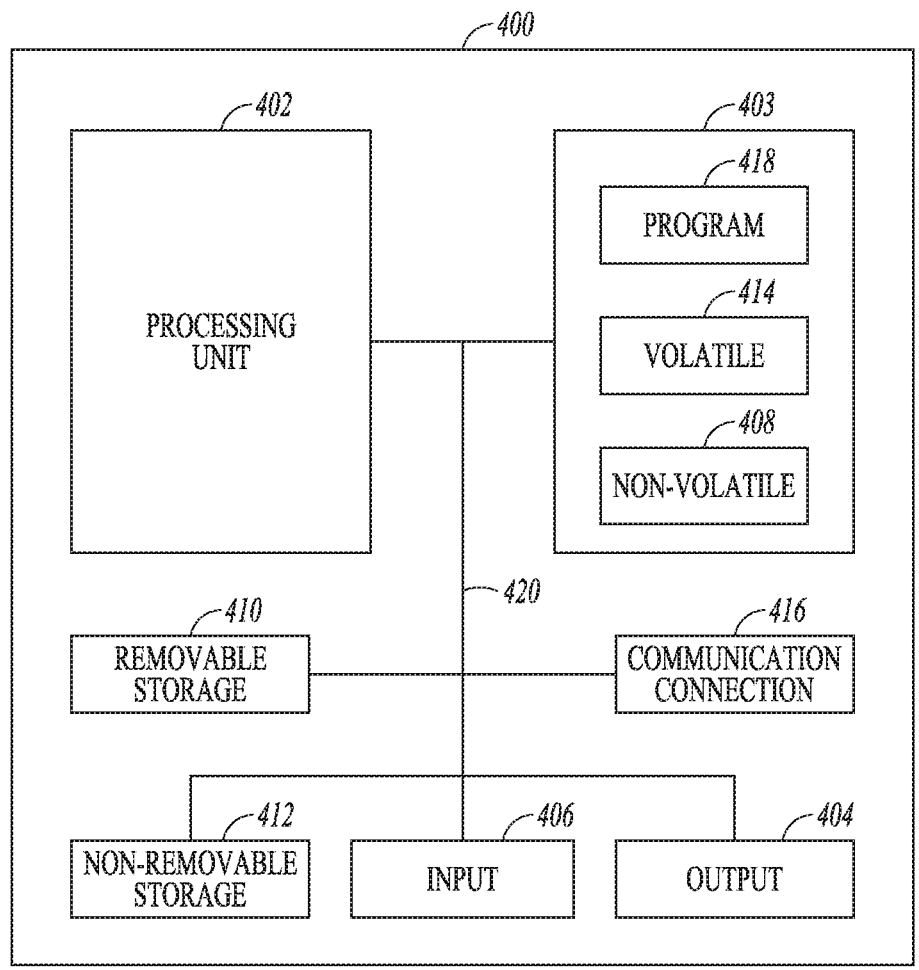
FIG. 4 is a block schematic diagram of a computer system to implement methods according to example embodiments.

FIG. 4 is a block schematic diagram of a computer system 400 to receive data and perform location and tracking calculations and implement further methods according to example embodiments. All components need not be used in various embodiments. Computer 400 may be used in different forms suitable for masters and slaves, as well as further networked resources, such as cloud computing resources, servers, and wireless mobile devices of all forms that may be used for viewing location and tracking information for selected assets.

One example computing device in the form of a computer 400 may include a processing unit 402, memory 403, removable storage 410, and non-removable storage 412. Although the example computing device is illustrated and described as computer 400, the computing device may be in different forms in different embodiments. For example, the computing device may instead be a smartphone, a tablet, smartwatch, or other computing device including the same or similar elements as illustrated and described with regard to FIG. 4. Devices, such as smartphones, tablets, and smartwatches, are generally collectively referred to as mobile devices or user equipment. Further, although the various data storage elements are illustrated as part of the computer 400, the storage may also or alternatively include cloud-based storage accessible via a network, such as the Internet or server based storage.

Memory 403 may include volatile memory 414 and non-volatile memory 408. Computer 400 may include—or have access to a computing environment that includes—a variety of computer-readable media, such as volatile memory 414 and non-volatile memory 408, removable storage 410 and non-removable storage 412. Computer storage includes random access memory (RAM), read only memory (ROM), erasable programmable read-only memory (EPROM) or electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 400 may include or have access to a computing environment that includes input interface 406, output interface 404, and a communication interface 416. Communication interface may include an antenna for wireless communications. Output interface 404 may include a display device, such as a touchscreen, that also may serve as an input device. The input interface 406 may include one or more of a voice activation device, touchscreen, touchpad, mouse, keyboard, camera, one or more device-specific buttons, one or more sensors integrated within or coupled via wired or wireless data connections to the computer 400, and other input devices. The computer may operate in a networked environment using a communication connection to connect to one or more remote computers, such as database servers. The remote computer may include a personal computer (PC), server, router, network PC, a peer device or other common DFD network switch, or the like. The communication connection may include a Local Area Network (LAN), a Wide Area Network (WAN), cellular, Wi-Fi, Bluetooth, Wireless mesh or other networks. According to one embodiment, the various components of computer 400 are connected with a system bus 420.

Computer-readable instructions stored on a computer-readable medium are executable by the processing unit 402 of the computer 400, such as a program 418. The program 418 in some embodiments comprises software that, when executed by the processing unit 402, performs network switch operations according to any of the embodiments included herein. Program 418 may also include a time of flight ranging engine. A hard drive, CD-ROM, and RAM are some examples of articles including a non-transitory computer-readable medium such as a storage device. The terms computer-readable medium and storage device do not include carrier waves to the extent carrier waves are deemed too transitory. Storage can also include networked storage, such as a storage area network (SAN). Computer program 418 may be used to cause processing unit 402 to perform one or more methods, or algorithms described herein.

EXAMPLES

In example 1, a location system includes multiple master nodes located at corners of a coverage area. At least two master nodes are located on one edge of the coverage area and receive signals from a slave node within the coverage area. The at least two master nodes calculate a distance to the slave node and a location of the slave node within the coverage area.

Example 2 includes the location system of example 1 wherein the master nodes execute a LoRa time-of-flight ranging compliant communication protocol with the slave node to determine respective distances to the slave node.

Example 3 includes the location system of any of examples 1-2 wherein the master nodes are mounted in fixed positions.

Example 4 includes the location system of example 3 wherein the fixed positions are all at a same height selected to provide clear line of sight to slave nodes within the area of coverage.

Example 5 includes the location system of example 3 wherein the master nodes have moving positions and known distances with neighboring master nodes.

Example 6 includes the location system of any of examples 1-5 wherein the multiple master nodes comprise 4 master nodes, each positioned at a corner of a square coverage area.

Example 7 includes the location system of any of examples 1-6 wherein the master nodes are mounted on a flying drone capable of remaining at a fixed position while the signals are received.

Example 8 includes the location system of any of examples 1-7 wherein the slave node is associated with an object to be tracked.

Example 9 includes the location system of any of examples 1-8 wherein the calculation of the location of the slave node is a triangulation calculation performed in accordance with following equations: $X1=(D^2+a^2-b^2)/2D$ and $Y1=a^1-x1^2$ wherein a and b are the respective distances of the slave node to the master nodes, D is the distance between the two master nodes, and X1,Y1 are coordinates of the slave node within the coverage area, where the coordinates of the master nodes are 0,0, and 0,D.

In example 10, a method includes receiving signals object within a coverage area at at least two adjacent corners of the coverage area, determining a range of the object from each of the at least two adjacent corners, and calculating, via a computer, a location of the object within the coverage area in response to the determined ranges.

Example 11 includes the method of example 10 wherein the object comprises a communication system slave node and the at least two adjacent corners comprise a communication system master node.

Example 12 includes the method of example 11 wherein the master nodes execute a LoRa time-of-flight ranging compliant communication protocol with the slave node.

Example 13 includes the method of any of examples 11-12 wherein the master nodes are mounted in fixed positions.

Example 14 includes the method of example 13 wherein the fixed positions are all at a similar height.

Example 15 includes the method of example 14 wherein the height is selected to provide clear line of sight to slave nodes within the coverage area.

Example 16 includes the method of any of examples 10-15 wherein the master nodes are mounted on a flying drone capable of remaining at a fixed position while the signals are received.

Example 17 includes the method of any of examples 11-16 wherein the slave node is associated with an object to be tracked.

Example 18 includes the method of any of examples 11-17 wherein the calculation of the location of the slave node is a triangulation calculation.

In example 19, a machine-readable storage device has instructions for execution by a processor of the machine to perform operations. The operations include receiving signals from an object within a coverage area at at least two adjacent corners of the coverage area, determining a range of the object from each of the at least two adjacent corners, and calculating a location of the object within the coverage area in response to the determined ranges.

Example 20 includes the location system of example 19 wherein the object comprises a communication system slave node and the at least two adjacent corners comprise a communication system master node, wherein the master nodes execute a Lola time-of-flight ranging compliant communication protocol with the slave node, the master nodes are mounted in fixed positions at a similar height selected to provide clear line of sight to slave nodes within the coverage area, and wherein the calculation of the location of the slave node is a triangulation calculation.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A location system comprising:
multiple master nodes located at corners of a coverage area, wherein at least two master nodes on one edge of the coverage area receive signals from a slave node within the coverage area and calculate a distance to the slave node and a location of the slave node within the coverage area, wherein the at least two master nodes are located at a same height to provide clear line of sight to slave nodes within the coverage area, and wherein the multiple master nodes define a minimum perimeter polygon such that the coverage area is entirely within such polygon, wherein the calculation of the location of the slave node is a calculation performed in accordance with following equations: $X1=(D^2+a^2-b^2)/2D$ and $Y1=a^2-X1^2$, wherein a and b are the respective distances of the slave node to the at least two master nodes, D is the distance between two master nodes, and X1,Y1 are coordinates of the slave node within the coverage area, where the coordinates of the at least two master nodes are 0,0, and 0,D.

2. The location system of claim 1, wherein the at least two master nodes execute a LoRa time-of-flight ranging compliant communication protocol with the slave node to determine respective distances to the slave node, and wherein at least a third master node is used to ensure an object is within the polygon.

3. The location system of claim 1, wherein the at least two master nodes are mounted in fixed positions.

4. The location system of claim 3, wherein the fixed positions are all at a same height selected to provide clear line of sight to the slave nodes within the area of coverage.

5. The location system of claim 3, wherein the at least two master nodes have moving positions and known distances with neighboring master nodes.

6. The location system of claim 1, wherein the multiple master nodes comprise 4 master nodes, each positioned at a corner of a square coverage area.

7. The location system of claim 1, wherein the at least two master nodes are mounted on a flying drone capable of remaining at a fixed position while the signals are received.

8. The location system of claim 1, wherein the slave node is associated with an object to be tracked.

9. A method comprising:
receiving signals from a slave node within a coverage area to at least two master nodes on adjacent corners of the coverage area;
determining a range of the object from each of the at least two adjacent corners; and
calculating, via a computer, a location of the slave node within the coverage area in response to the determined ranges, wherein the at least two master nodes are located at a same height to provide clear line of sight to slave nodes within the coverage area, and wherein multiple master nodes define a minimum perimeter polygon such that the coverage area is entirely within such polygon, wherein the calculation of the location of one of the slave nodes is a calculation performed in accordance with following equations: $X1=(D^2+a^2-b^2)/2D$ and $Y1=a^2-X1^2$, wherein a and b are the respective distances of the slave node to the at least two master nodes, D is the distance between two master nodes, and X1,Y1 are coordinates of the slave node within the coverage area, where the coordinates of the at least two master nodes are 0,0, and 0,D.

10. The method of claim 9, wherein the slave node comprises a communication system slave node and each of the at least two master nodes on adjacent corners comprise communication system master nodes.

11. The method of claim 10, wherein the communication system master nodes execute a LoRa time-of-flight ranging compliant communication protocol with the communication system slave node.

12. The method of claim 10, wherein the communication system master nodes are mounted in fixed positions.

13. The method of claim 12, wherein the fixed positions are all at a similar height.

14. The method of claim 13, wherein the height is selected to provide clear line of sight to the communication system slave nodes within coverage area.

15. The method of claim 10, wherein the communication system slave node is associated with an object to be tracked.

16. The method of claim 10 wherein the calculation of the location of the communication system slave node is a triangulation calculation.

17. The method of claim 9, wherein the communication system master nodes are mounted on a flying drone capable of remaining at a fixed position while the signals are received.

18. A non-transitory machine-readable storage device having instructions for execution by a processor of the machine to perform operations comprising:
receiving signals from a slave node within a coverage area at at least two master node on adjacent corners of the area of coverage;
determining a range of the slave node from each of the at least two master nodes on adjacent corners; and
calculating a location of the slave node within the coverage area in response to the determined ranges, wherein the at least two master nodes are located at a same height to provide clear line of sight to slave nodes within the coverage area, and wherein multiple master nodes define a minimum perimeter polygon such that the coverage area is entirely within such polygon, wherein the calculation of the location of one of the slave nodes is a calculation performed in accordance with following equations: $X1=(D^2+a^2-b^2)/2D$ and $Y1=a^2-X1^2$, wherein a and b are the respective distances of the slave node to the at least two master nodes, D is the distance between two master nodes, and X1,Y1 are coordinates of the slave node within the coverage area, where the coordinates of the at least two master nodes are 0,0, and 0,D.

19. The non-transitory machine-readable storage device of claim 18, wherein the slave node comprises a communication system slave node and each of the at least two master nodes on adjacent corners comprise a communication system master node, wherein the communication system master nodes execute a LoRa time-of-flight ranging compliant communication protocol with the communication system slave node, the communication system master nodes are mounted in fixed positions at a similar height selected to provide clear line of sight to communication system slave nodes within the coverage area and wherein the calculation of the location of the communication system slave node is a triangulation calculation.

* * * * *